US008360863B2

(12) United States Patent
Friedman

(10) Patent No.: US 8,360,863 B2
(45) Date of Patent: *Jan. 29, 2013

(54) WAGERING GAMES ALLOWING PLAYER TO WAGER ON ITERATIVE SIMULTANEOUS INDEPENDENT WAGERS WITH DIFFERENT VARIANCES

(76) Inventor: Stacy A. Friedman, Beaverton, OR (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/790,909

(22) Filed: May 31, 2010

(65) Prior Publication Data

US 2010/0304849 A1 Dec. 2, 2010

Related U.S. Application Data

(63) Continuation-in-part of application No. 11/009,943, filed on Dec. 10, 2004, now Pat. No. 7,727,067.

(60) Provisional application No. 60/528,991, filed on Dec. 12, 2003.

(51) Int. Cl.
*A63F 9/24* (2006.01)
*A63F 13/00* (2006.01)

(52) U.S. Cl. ........................................ 463/25; 463/16

(58) Field of Classification Search ............. 463/16–20, 463/25

See application file for complete search history.

(56) References Cited

U.S. PATENT DOCUMENTS 4,856,787 A * 8/1989 Itkis .............................. 273/237
7,727,067 B2 * 6/2010 Friedman ........................ 463/25

* cited by examiner

*Primary Examiner* — Arthur O. Hall
*Assistant Examiner* — Jasson Yoo
(74) *Attorney, Agent, or Firm* — Muskin & Cusick LLC

(57) ABSTRACT

A method to implement a wagering game which allows a player to make multiple bets on independent outcomes. The outcome distributions/variances of each of the bets can vary. The player can, for example, place a bet on whether cards drawn from independent decks will have the same suit, the outcomes of which are entirely independent of each other.

2 Claims, 8 Drawing Sheets

WAGERING GAMES ALLOWING PLAYER TO WAGER ON ITERATIVE SIMULTANEOUS INDEPENDENT WAGERS WITH DIFFERENT VARIANCES

CROSS REFERENCE TO RELATED APPLICATIONS

This application is a continuation in part of U.S. application Ser. No. 11/009,943, filed on Dec. 10, 2004 now U.S. Pat. No. 7,727,067 (which is incorporated by reference herein in its entirety), now allowed, which claims benefit to Provisional Application No. 60/528,991, entitled, "Method for Providing Player Selectable Variance in Wagering Games," filed on Dec. 12, 2003, which is incorporated by reference herein in its entirety.

BACKGROUND OF THE INVENTION

1. Field of the Invention

The present invention is directed to a method, device, and computer readable storage medium for implementing a wagering game wherein a player can place numerous bets on independent events with distinct random distributions/variances.

2. Description of the Related Art

In nearly all wagering games, a single random element is used to select the outcome of the game. In the game of casino craps, a pair of dice is thrown which yields an outcome between two and twelve. In the game of American roulette, a ball is dropped into a spinning wheel which comes to rest in one of thirty-eight numbered cups. In the game of blackjack, one or more standard decks of playing cards are shuffled and cards are dealt according to a fixed set of rules. In slot machines, a pseudo-random number generator produces a set of reel strip indices which instruct the slot machine to display a particular set of symbols. In keno, a pseudo-random number generator produces twenty random numbers from the list 1 . . . 80 to form the game outcome.

In craps, the random event is the throw of the dice. In roulette, the random event is the ball dropping into the cup. In blackjack, the random event is the shuffle of the cards. In slot machines, the random event is the generation of the reel strip indices. In keno, the random event is the generation of the twenty numbers. All of these random events are singular in nature; only one random event is required to generate an outcome for craps, roulette, blackjack, slot machines, or keno. In fact, in the case of blackjack or certain other card games, a single random event (the shuffle) is actually used to determine the outcome of multiple consecutive games.

The only known instance involving wagering on the outcome of more than one random event is in the field of sports wagering, on a bet known as a parlay or parlay card. Such a wager involves picking the winners of several independent games and winning an increased amount if correct. When betting on football, for example, a parlay card bettor may select five different games. If the bettor correctly guesses the winning outcome for all five games, his parlay card is a winner. If not, the bettor loses his wager.

Parlay cards have several disadvantages. They are an all-or-nothing wager, much like betting on the extreme longshot to win a horserace. In addition, the house advantage for a parlay card is extremely high, usually in excess of 25%. This is worse than any wager available on a table game or slot machine. The benefits of a parlay card, however, are that a bettor may win a large amount of money with only a small initial outlay, and the bettor can selectively alter his probability of winning (and thereby the mathematical variance of the wager) by varying the components of the parlay card.

Being able to alter the variance (expected range of outcomes) of a bet is an important feature for many gamblers. A game with high variance will have a higher probability of very high awards (e.g. a slot machine) while a game with low variance will have a high probability of lower awards (e.g. blackjack). The majority of casino wagers have a fixed variance, which means a casino patron wishing to alter the mathematical distribution of his or her next wager must relocate to another game. This presents a major disadvantage for slot machine patrons in particular: players desiring a game with more frequent, smaller awards rather than less frequent, larger awards must cash out of their existing machine, find a different machine to play, and deposit new fund prior to the continuation of play.

There are some exceptions: it is noted that the ability to alter the winning probability of a game is not unique to parlay cards. For example, in roulette the player can alter the probability of winning by wagering on more than one inside (individual) number. A disadvantage of roulette in this regard is the dependent and conflicting nature between any two inside number wagers. If one wager wins, the other wager must necessarily lose. These wagers are not independent since it is impossible for both to win simultaneously. A further disadvantage of roulette in this regard is that each wager covering the same number of spots on the wheel has an identical variance.

No casino table game or slot game provides the bettor with a method to wager on multiple independent outcomes featuring a plurality of variances and to therefore directly affect his or her overall wager variance through bet selection.

Therefore, what is needed is a way to provide players with a way to bet on multiple independent outcomes simultaneously.

SUMMARY OF THE INVENTION

It is an aspect of the present invention to provide players an opportunity to place multiple bets simultaneously in an entertaining manner.

The above aspects can be obtained by a method that includes: (a) receiving a cash amount and converting the cash amount into playable money; (b) wagering on two or more independently determined events of varying variance and respective wager amounts using the playable money; and (c) determining outcomes of the two or more independently determined events.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
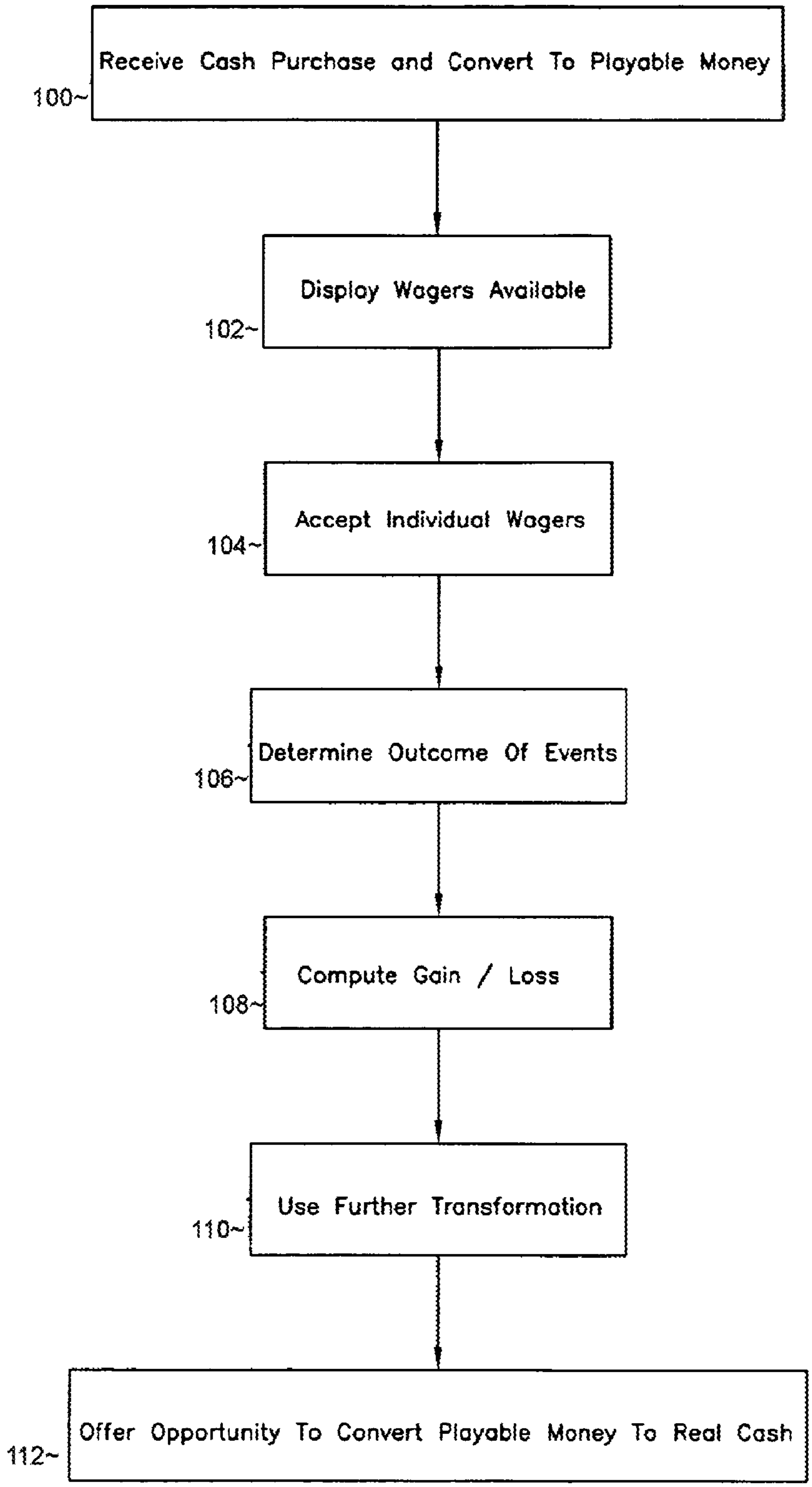
FIG. 1 is a flowchart illustrating a method of implementing the present inventive concept, according to an embodiment.

Reference will now be made in detail to the presently preferred embodiments of the invention, examples of which are illustrated in the accompanying drawings, wherein like reference numerals refer to like elements throughout.

The present invention relates to providing a wagering game wherein multiple bets can be placed on independent events, each event (or payoff on the event) having a different variance (or other wagering property). Outcomes of the multiple bets can be determined or reported simultaneously. Further, such bets can be placed over and over again in an iterative fashion, allowing the player to make multiple successive wagers.

Allowing a player to make simultaneous wagers, each wager with its own properties, allows the player a more exciting wagering experience. For example, wagering on a 50/50 (even) proposition, the player can only hope to double his or her money. If a player wagers on a 10:1 proposition, the player can hope to receive ten times his or her money, but of course the chances of doing so are less than the even money wager. Preferably (although not required), each wager is independent of the others.

In an embodiment, different wagers can represent different imaginary stocks. For example, stock A, stock B, and stock C can be presented to the player. Each stock has different properties, such as variance, etc. The player can choose to wager on any combination of these stocks, and can wager a chosen amount on each.

In addition to stocks, each wager can represent any other type of wagering interest, such as horses, sporting events, random events, games using cards, etc.

FIG. 1 is a flowchart illustrating a method of implementing the present inventive concept, according to an embodiment.

The method starts with operation 100, which receives a cash purchase and converts the cash purchase to playable money. Cash can be inserted using any known mechanism, such as inserting a bill into a bill acceptor, using a cashless ticket, etc. The cash purchase amount can be converted into playable money by multiplying the amount of cash inserted by a constant (the constant can be 1 for an even exchange of real vs. playable money). This operation can be operational throughout the entire game.

The method then continues to operation 102, which displays the wagers available. The wagers can be displayed with their respective properties. This operation will be discussed below in more detail.

From operation 102, the method proceeds to operation 104, which accepts individual wagers from the player. The player can select which individual wagers to make (e.g. stocks) and how much to wager on each one. This operation will be discussed below in more detail. An aggregated original wager amount is the amount of the wagers combined.

From operation 104, the method proceeds to operation 106, which determines the outcomes of the wagers. This can be for a single event or a block of events (e.g. a trading day comprised of individual events such as trading hours). This operation will be described below in more detail.

From operation 106, the method proceeds to operation 108, which computes the player's gain/loss for the wagers made. The gain/loss is based on the outcomes determined in operation 106. For example, if $100 was an original aggregated wager, and based on the outcomes the player has won $20, the player has gained $20 (or 20%). This operation may be inherent in operation 104 (and any of the other operations as well), depending on implementation.

From operation 108, the method proceeds to operation 110, which can then use a further transformation based on the results of the previous wagers. This operation is optional. For example, Table I presents a table of gains and respective wins/losses. Table I is just an example, and any other combination of loss/gains and payoff can be used.

TABLE I

| loss/gain | pays |
|---|---|
| −100-0% loss | 0 |
| 0%-10% gain | 1× |
| 10%-20% gain | 2× |
| 20%-30% gain | 5× |
| 30%-40% | 15× |
| 40%-50% | 35× |
| 50%-75% | 75× |
| 75%-100% | 100× |
| 100%-150% | 250× |
| over 150% | 1000× |

Thus, for example, after a player's wagers are determined, if the player has achieved a 12% gain in operation 106 from the initial amount wagered, then from Table I the player wins 2× (double) his or her original aggregated wager amount. This amount is added to the player's playable amount. This can make the game more exciting. This type of transformation can take place after a single outcome is determined, or more typically, after a block of outcomes are determined (e.g. an end of the trading day).

From operation 110, the method can proceed to operation 112, which offers the player an opportunity to cash out the playable amount. This can be accomplished by multiplying the playable amount by a constant, typically the reciprocal of the constant used in operation 100.

As an alternative to operation 110, if the player wishes to continue to play, the method can then return to operation 102 to continue the game.

It is noted that any of the operations in FIG. 1 (and the remaining figures as well) are optional. Further, the operations described in FIG. 1 (and the remaining figures as well) can be performed in any sensible order. For example, the opportunity to convert playable money to real cash (operation 112) can be performed after operations 100, 102, etc. As a further example, the determining of the outcomes of events (operation 106) can in theory be performed before operations 104 or 102 if the outcomes are not displayed.

Figure 2A:
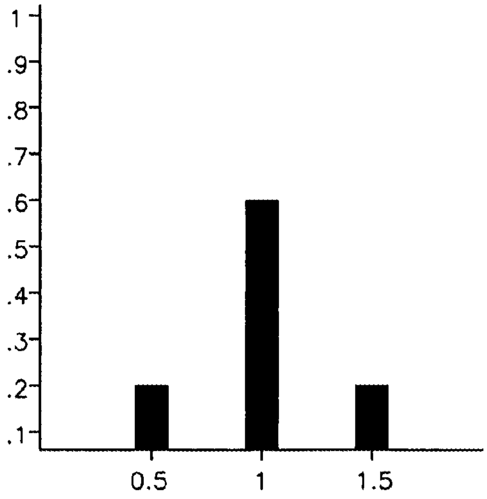
FIG. 2A is a graph illustrating payouts of a first exemplary wager, according to an embodiment.

FIG. 2A is a graph illustrating payouts of a first exemplary wager, according to an embodiment.

In FIG. 2A, the x-axis represents a ratio value and the y-axis represents the probability of attaining the respective ratio value. For example, a 0.50 (50%) ratio value has a 0.2 (20%) chance of occurring. A 1 (100%) ratio value has a 0.6 (60%) chance of occurring. A 1.5 (150%) ratio value has a 0.2 (20%) chance of occurring. Thus, if an initial value is $1, there is a 20% chance of the value becoming 0.50 (0.5*$1), a 60% chance of the value staying at $1, and a 20% chance of the value becoming $1.50 (1.5*$1).

The event characterized in FIG. 2A represents a discrete function. However, such probability distributions can also be continuous as illustrated in FIGS. 2B and 2C.

Figure 2B:
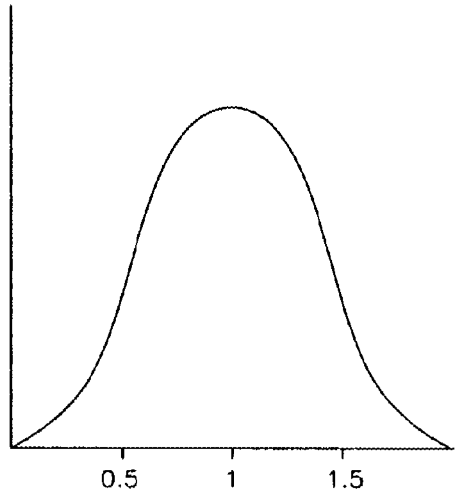
FIG. 2B is a graph illustrating payouts of a second exemplary wager, according to an embodiment.

FIG. 2B is a graph illustrating payouts of a second exemplary wager, according to an embodiment. FIG. 2C is a graph illustrating payouts of a third exemplary wager, according to an embodiment. Note that the area under the curves in FIGS. 2B and 2C should typically be one, and that the y axis represents a probability of attaining the respective x-axis value.

Figure 2C:
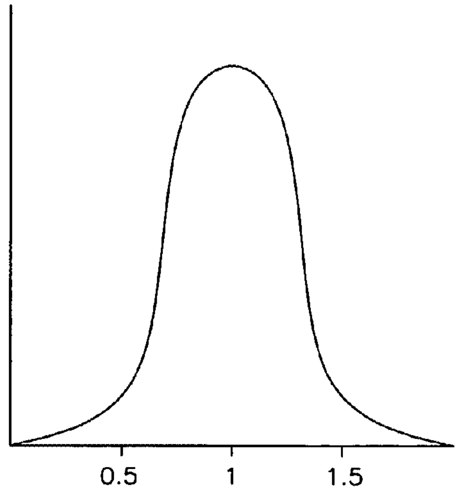
FIG. 2C is a graph illustrating payouts of a third exemplary wager, according to an embodiment.

Note that the bell shape is more narrow in FIG. 2C as opposed to 2B. This means that a wager represented by FIG. 2B is riskier than FIG. 2C. Hence, FIG. 2C has a lower variance than FIG. 2B.

To make a game which models stock trading, it may be more realistic to speak in terms of a block of individual time units, e.g. a block of 6 simulated hours. Each simulated hour can take on properties of a histogram such as those illustrated. A histogram can also be generated which aggregates a block of results into one histogram. For example, if the histogram in FIG. 2A represents one iteration of a time unit, then a further histogram (not pictured) can represent the results in FIG. 2A applied successively 6 times. It is more intuitive to display histograms that represent a block of events (e.g. a simulated trading day of several iterations) as opposed to a single event (e.g. a simulated trading hour). Thus, for example, FIG. 2A can represent properties of stock A for an entire trading day (which is comprised of individual events such as 6 events). Each individual event would have its own histogram which when iteratively applied, would look like FIG. 2A. Any such histogram of properties of wagers can be displayed to players. It is also noted that in a further embodiment, discrete time units may not be required and a block (e.g. a trading day) can comprise continuous (non-discrete) events. However, in real life computer simulation, even a continuous stream of events is typically broken down into particular discrete events. In a further embodiment, a block of events is not required and a single event (e.g. such as that pictured in FIG. 2A) can be used for wagering.

Figure 3A:
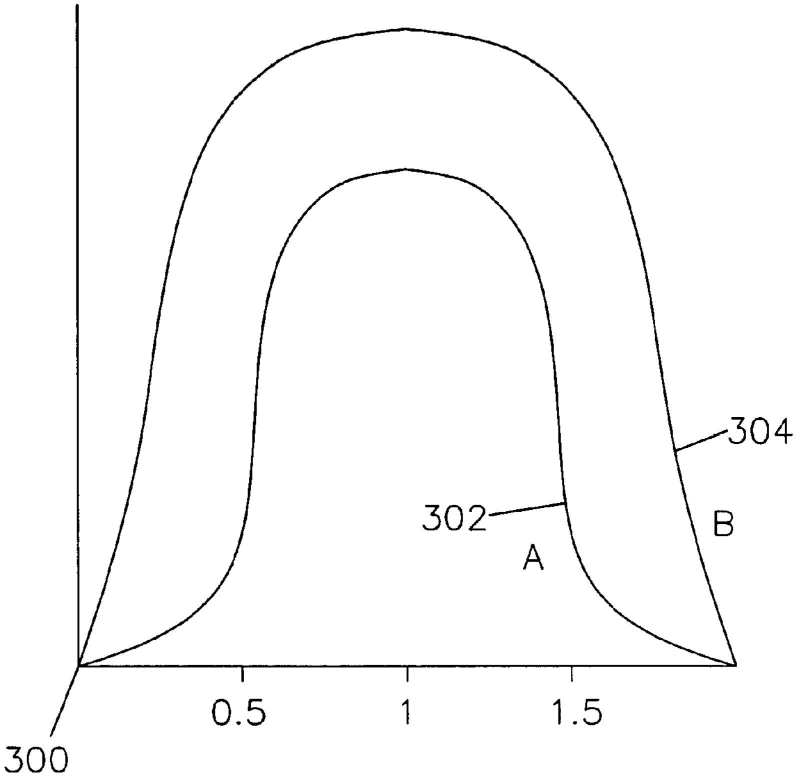
FIG. 3A is a graph illustrating properties of multiple wagers, according to an embodiment.

FIG. 3A is a graph illustrating properties of multiple wagers, according to an embodiment.

A combined graph 300 illustrates properties of multiple wagers. Wager A distribution 302 and Wager B distribution 304 are combined into the combined graph 300. Note that the distributions illustrated herein are not results of the wager but properties of each wager which are used to determine their respective outcome.

Figure 3B:
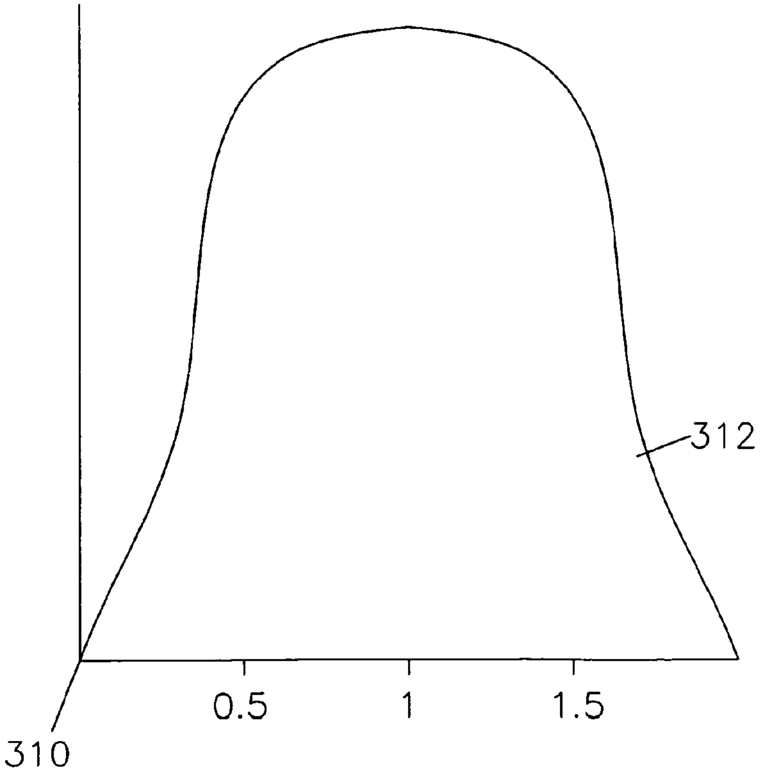
FIG. 3B is a graph illustrating properties of an aggregated wager, according to an embodiment.

FIG. 3B is a graph illustrating properties of an aggregated wager, according to an embodiment.

Individual wagers can be combined into a combined graph 312. A combined graph 312 allows a player to easily view properties of his or her aggregate wagers. If even amounts are bet on wager A and wager B, then a simple average can be taken from wager A distribution 302 and wager B distribution 304. If uneven amounts are bet, then a weighted average can be taken between wager A distribution 302 and wager B distribution 304 multiplying each by a respective amount bet.

Figure 4A:
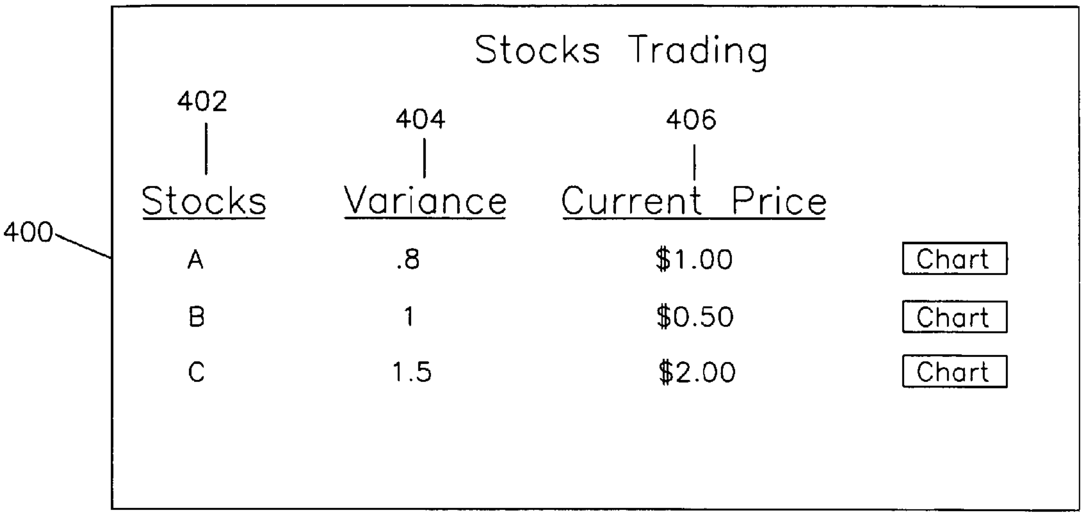
FIG. 4A is an exemplary output display of an interface of the present inventive concept, according to an embodiment.

FIG. 4A is an exemplary output display of an interface of the present inventive concept, according to an embodiment.

An wager offer display 400 displays a plurality of possible wagers 402, properties of the respective wager 404 (such as variance) and a current price 406 of each of the possible wagers.

Other properties of the individual wagers can be displayed as well, such as historical data (such as stock splits), stock ratings, historical charts, etc. The historical charts can be "real" historical data, e.g. historical data that was generated by the game previously (with the current or prior player(s).

Figure 4B:
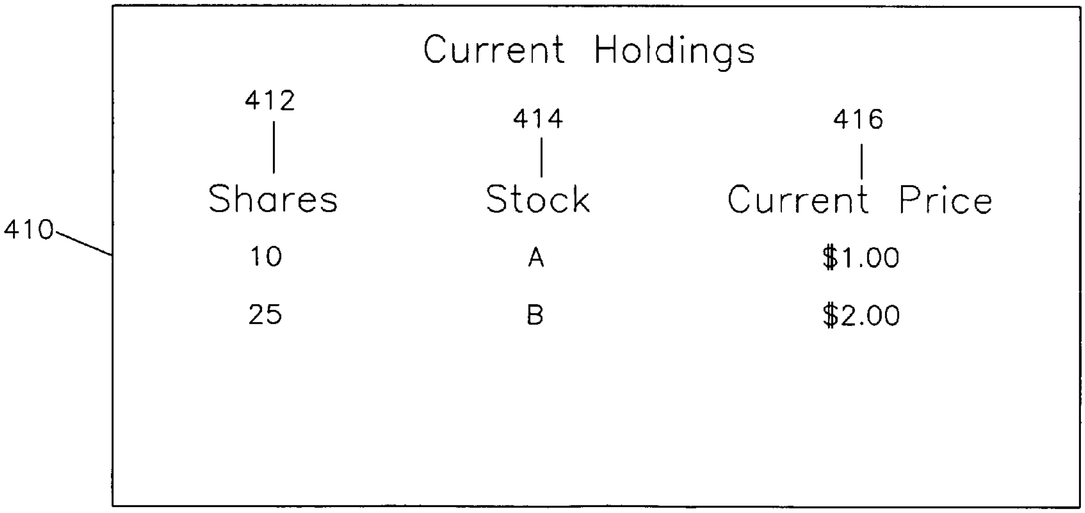
FIG. 4B is an exemplary output display of a current holdings display, according to an embodiment.

FIG. 4B is an exemplary output display of a current holdings display, according to an embodiment.

A holdings display 410 displays a current wager list 414 (such as stocks) indicates current wagers purchased. A shares list 412 lists a respective number of shares. A current price list 416 lists a respective price for each of the wagers. Any other properties of such wagers can be displayed as well.

Further, by selecting (e.g. touching or pointing to) a stock in either of wager offer display 400 or the holdings display 410 can bring up a screen with further information about the stock (such as a graph such as those illustrated in FIG. 2A, 2B or 2C, or a historical chart.

Figure 5:
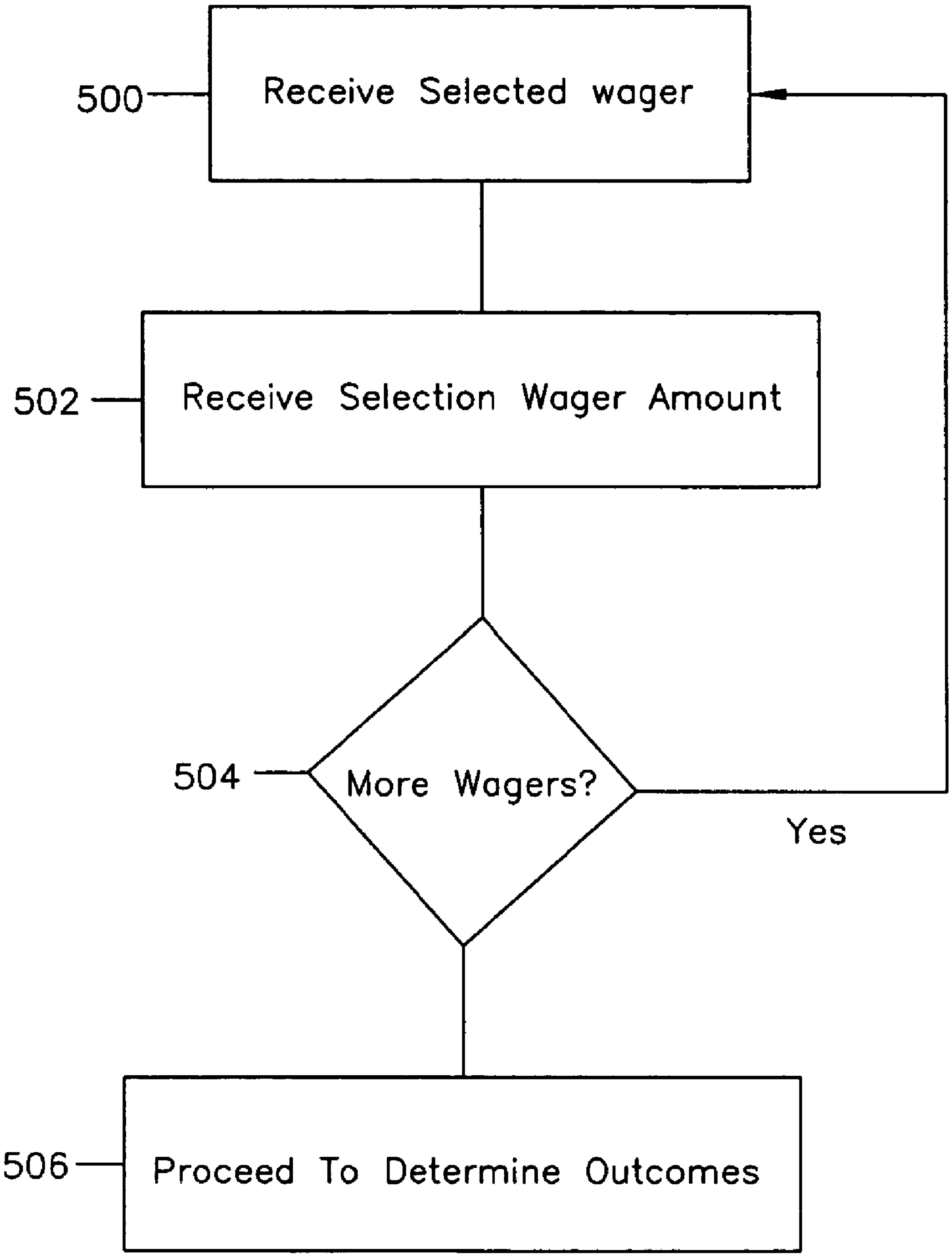
FIG. 5 is a flowchart illustrating a method of accepting wagers, according to an embodiment.

FIG. 5 is a flowchart illustrating a method of accepting wagers, according to an embodiment. This can be associated with operation 104 of FIG. 1.

The method starts with operation 500, which receives a selected wager. A player can indicate his or her selected wager by using any known input device, such as a keyboard, mouse, touch screen, etc. The available wagers can be displayed to the player as previously described.

The method continues to operation 502, which receives a selected amount for the particular wager. The player can indicate his or her selected wager amount by pressing buttons on a touch screen or a numeric keypad.

From operation 502, the method proceeds to operation 504, which determines if more wagers are desired. The player can indicate his or her such preferences by using an input device to indicate if he or she wishes to place more wagers. If so, then the method can return to operation 500 which continues to receive additional wagers.

If the player indicates in operation 504 that no more wagers are desired, then the method can proceed to operation 506 which then proceeds to determine outcomes of the wagers.

Figure 6:
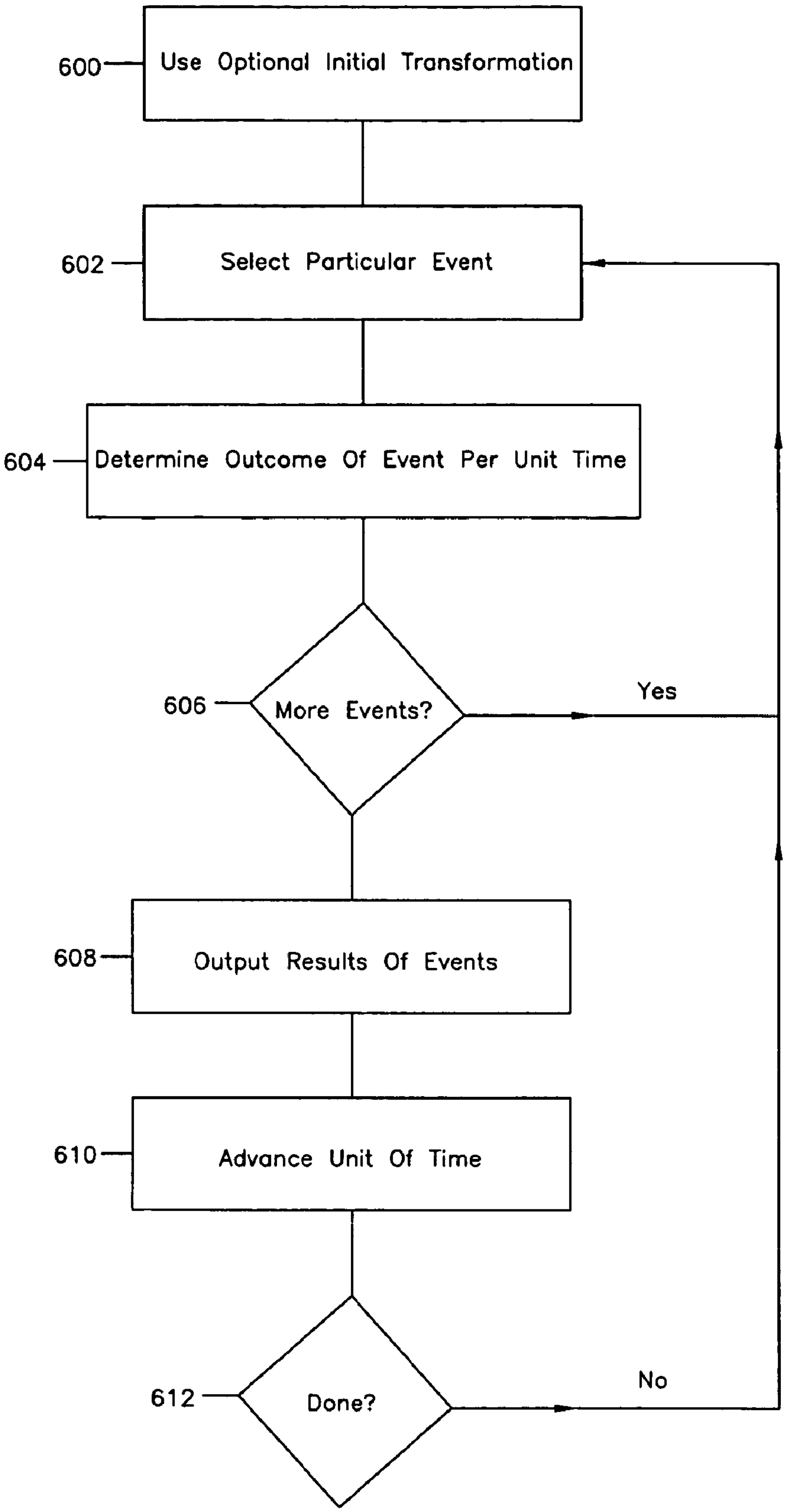
FIG. 6 is a flowchart illustrating a method of processing iterative wagers, according to an embodiment.

FIG. 6 is a flowchart illustrating a method of processing iterative wagers, according to an embodiment. This method can be associated with operation 106 in FIG. 1. This method assumes a game which accepts wagers on a block of events, e.g. a trading day comprising 6 events (e.g. simulated hours).

The method beings with operation 600, which uses an initial transformation. An initial transformation can adjust some or all of the stocks (or other events) before their respective events have even begun to be determined. For example, all stocks can be increased or decreased in value by x % (wherein x is any number such as 10) before trading even begins. This operation can be entirely optional and may add more excitement to the game. Alternatively, such a transformation can take place during or after the block of events, such as midway through a simulated trading day.

The method then proceeds to operation 602 which selects a particular event. An event can be a particular stock's activity, for example stock A.

From operation 602, the method proceeds to operation 604, which determines the outcome of the event per unit time. For example, stock A can increase in value, decrease in value, or remain the same. The change in value can be determined by stock A's predetermined properties. The outcome of each event can be determined for example based on a histogram as illustrated in FIG. 2A. This can be accomplished as known in the art, for example using an inverse cumulative function.

From operation 604, the method can proceed to operation 606 which determines if there are more events. If there are other events (e.g. other stocks to be traded such as stock B), then the method can proceed to operation 602 which determines the outcome for that event.

If there are no more events to be determined in operation 606, then the method can proceed to operation 608 which outputs results of the events determined in operation 604. Note that what is outputted is event data for a unit of time (e.g. a trading hour). The data can be outputted in graph format which updates in a temporal basis.

From operation 608, the method can proceed to operation 610, which advances a unit of time. Thus, results for the next trading hour can be determined.

From operation 610, the method proceeds to operation 612, which determines if the method is done (e.g. if the "trading day" is over). If not all units of time in the block have been processed, then the method returns to operation 602 which continues to process individual events for the next unit of time.

Figure 7:
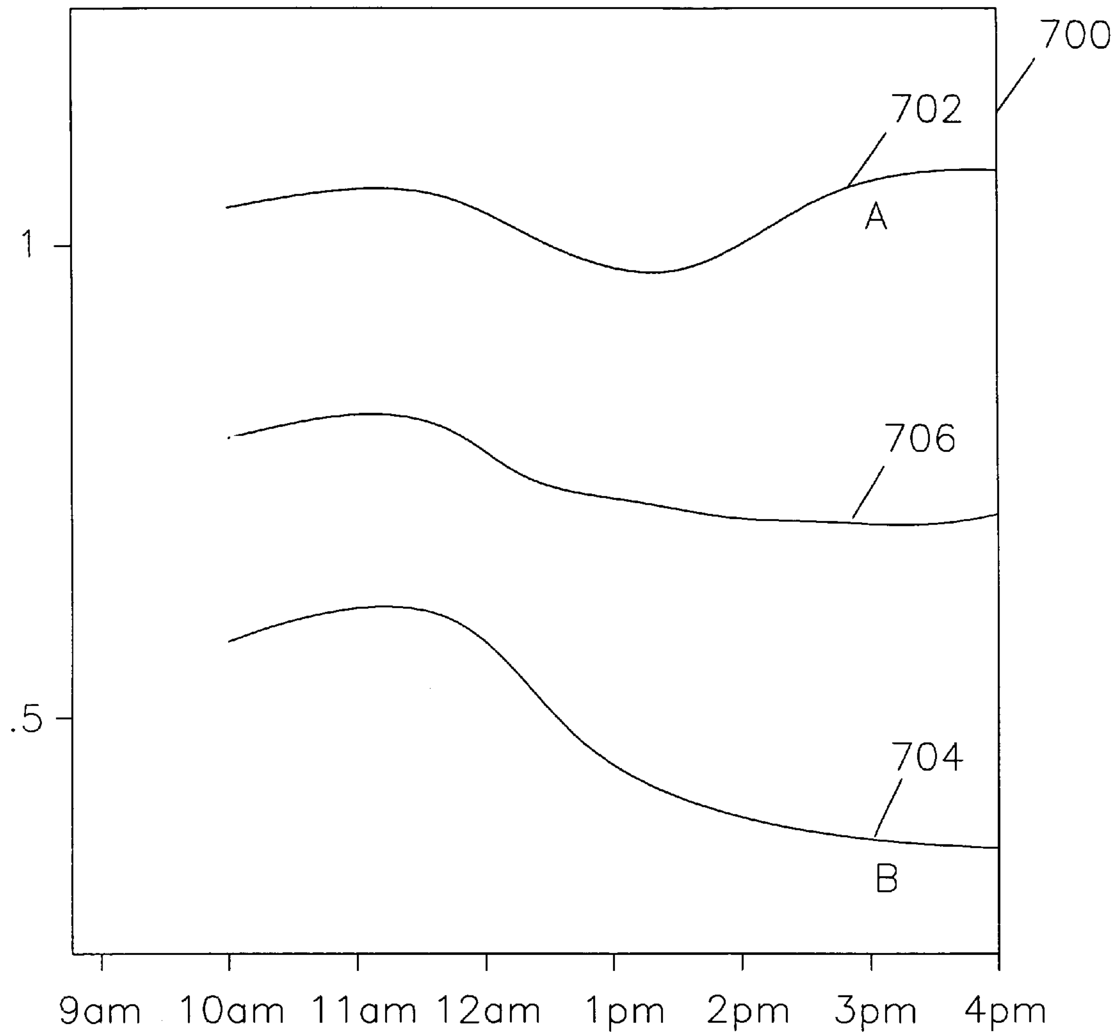
FIG. 7 is an exemplary output display of a trading day, according to an embodiment.

FIG. 7 is an exemplary output display of a trading day, according to an embodiment.

Stock output graph 700 represents a trading day for each stock. Stock A graph 702 represents stock A. Stock B graph 704 represents stock B. Aggregated graph 706 can represent an aggregation of current wagers, such as stock A and stock B. The aggregation can be a weighted average weighted by value of each respective stock.

As each unit of time progresses, the stock output graph 700 can be updated, e.g. from left to right. Each unit of time can be a discrete unit, for example an hour (or half hour, etc.) Between each unit of time, the graph for each stock can be connected with a straight line, a curve which fits the remaining values (whether they are visible or not—they can be predetermined and displayed later), or not connected at all. In a further embodiment, there are no discrete units of time, and outcomes are determined on a continuous basis.

The graph in FIG. 7 can be displayed in a temporal manner. In other words, it does not have to be displayed in its entirety all at once, but can be updated throughout time (e.g. from left to right). For example, each trading hour can be updated each real life second.

Figure 8:
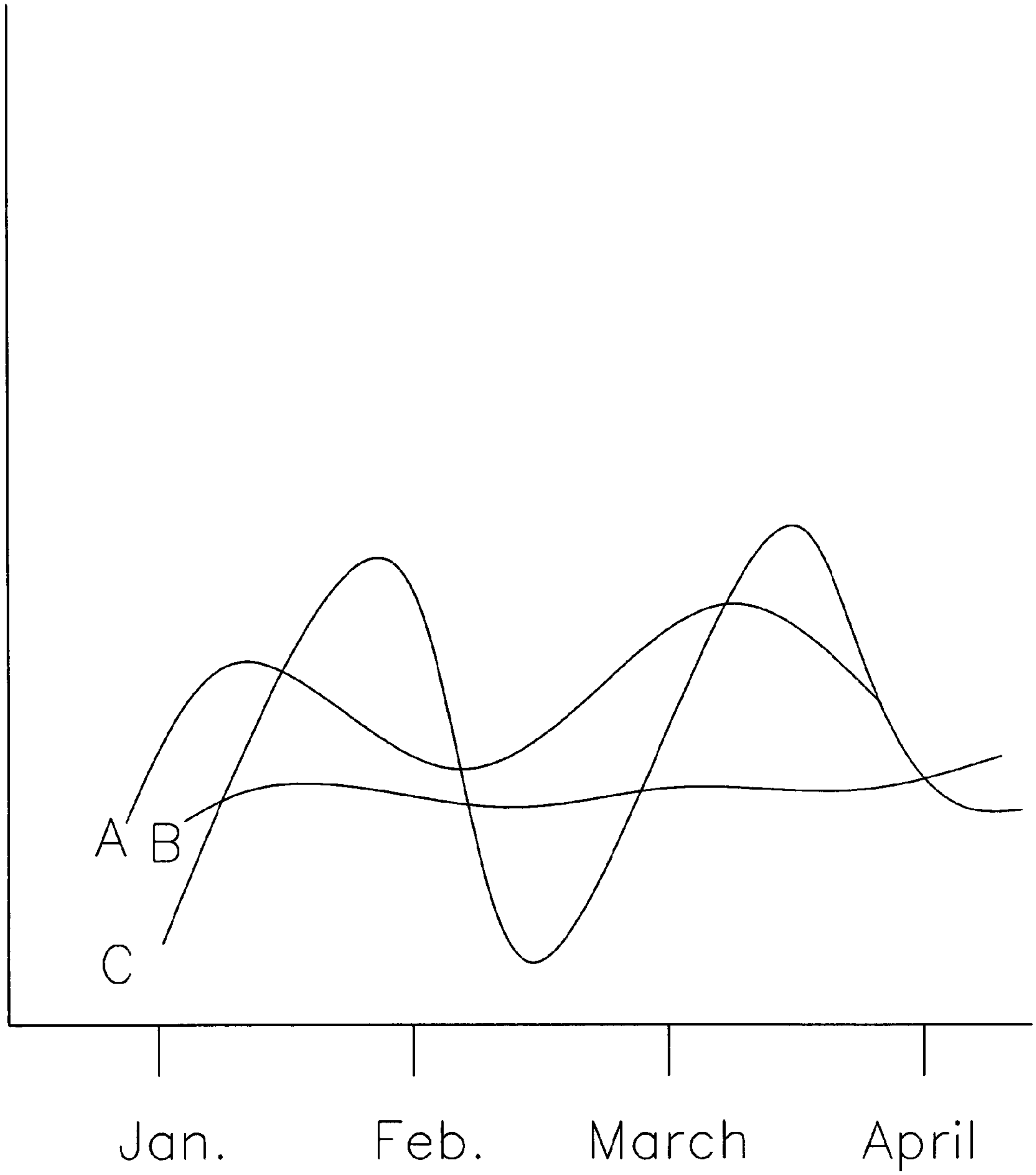
FIG. 8 is an exemplary output display of historical data, according to an embodiment.

FIG. 8 is an exemplary output display of historical data, according to an embodiment.

The output display displays historical price data for stocks A, B, C. While not pictured, the output display can also display any other data associated with stock charting, such as moving averages, stock splits, etc.

It is further noted that while the methods described herein have generally been described with respect to units of time in a block, the methods do not require a block and wagers can be made on single events. Further, while a block has been described with respect to a group of units representing time, a block can represent any type of aggregated wagers, such as results for multiple events all occurring simultaneously.

It is also noted that while the above description was described with references to fictitious stocks, the methods described herein can also be applied to other games and events as well. Such examples can include (but are not limited to), wagering on cards drawn from different decks (so that the outcomes are independent). For example, see Table II for independent events, winning conditions, and their respective payoffs.

TABLE II

| Event# | winning condition | payoff |
|---|---|---|
| 1 | 2 cards drawn from deck 1 have same suit | 3:1 |
| 2 | 3 cards drawn from deck 2 have same suit | 17:1 |
| 3 | 4 cards drawn from deck 3 have same suit | 85:1 |

The methods described herein can also be applied to any other type of wagers as well, such as independent roulette spins, outcomes of slot machines, outcomes of independent bingo or keno games, etc.

The methods described herein are also applicable to games played over a computer communications network, such as the Internet. A player can play such a game and view/perform operations required of him or her on a local computer, wherein other elements of the game can be served from a remote host.

It is also noted that any type of gaming machine can implement the present invention, whether the gaming machine is video or mechanical, finite or random environment, class III or any other class, local software or downloadable client, or any other software/hardware implementations of gaming machines currently known in the art.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method of implementing a wagering game, the method comprising:

performing the following operations on an electronic gaming machine:

receiving on the electronic gaming machine a cash amount from a player;

converting the cash amount into a playable amount of wagering credits;

simultaneously wagering on the electronic gaming machine a first amount W1 of the wagering credits on a first bet B1, and a second amount W2 of the wagering credits on a second bet B2, wherein a variance of B1 differs from a variance of B2, wherein B1 comprises at least two individual events B1*a* and B1*b*, and B2 comprises at least two individual events B2*a* and B2*b*;

generating and displaying on the electronic gaming machine the at least two events B1*a* and B1*b*, and calculating a first outcome O1 for the first amount W1 bet on the first bet B1;

generating and displaying on the electronic gaming machine the at least two events B2*a* and B2*b*, and calculating a second outcome O2 for the second amount W2 bet on the second bet B2;

computing an aggregated credit gain based on the first outcome and the second outcome;

determining an award amount based on the aggregated credit gain; and increasing the wagering credits on the electronic gaming machine by the award amount.

2. An electronic apparatus to implement a wagering game, the apparatus comprising:

an input device;

an output device;

a processor configured to operate with the input device and the output device, the processor configured to execute instructions to perform the following operations:

performing the following operations on an electronic gaming machine:

receiving on the electronic gaming machine a cash amount from a player;

converting the cash amount into a playable amount of wagering credits;

simultaneously wagering on the electronic gaming machine a first amount W1 of the wagering credits on a first bet B1, and a second amount W2 of the wagering credits on a second bet B2, wherein a variance of B1 differs from a variance of B2, wherein B1 comprises at least two individual events B1*a* and B1*b*, and B2 comprises at least two individual events B2*a* and B2*b;* generating and displaying on the electronic gaming machine the at least two events B1*a* and B1*b*, and calculating a first outcome O1 for the first amount W1 bet on the first bet B1;

generating and displaying on the electronic gaming machine the at least two events B2*a* and B2*b*, and calculating a second outcome O2 for the second amount W2 bet on the second bet B2;

computing an aggregated credit gain based on the first outcome and the second outcome;

determining an award amount based on the aggregated credit gain; and increasing the wagering credits on the electronic gaming machine by the award amount.

* * * * *